(12) United States Patent
Miyatani

(10) Patent No.: US 6,785,257 B1
(45) Date of Patent: Aug. 31, 2004

(54) BASE STATION

(75) Inventor: Tetsuhiko Miyatani, Tokyo (JP)

(73) Assignee: Kokusai Electric Co., Ltd., Tokyo (JP)

( * ) Notice: Subject to any disclaimer, the term of this patent is extended or adjusted under 35 U.S.C. 154(b) by 0 days.

(21) Appl. No.: 09/512,277

(22) Filed: Feb. 24, 2000

(30) Foreign Application Priority Data

Feb. 24, 1999  (JP) .......................................... 11-046729

(51) Int. Cl.$^7$ .............................................. H04B 7/216
(52) U.S. Cl. ...................................... 370/342; 370/348
(58) Field of Search ................................ 370/335, 342, 370/348, 522, 328, 350

(56) References Cited

U.S. PATENT DOCUMENTS

| | | | |
|---|---|---|---|
| 6,163,533 A | * 12/2000 | Esmailzadeh et al. | 370/342 |
| 6,269,088 B1 | 7/2001 | Masui et al. | |
| 6,381,229 B1 | * 4/2002 | Narvinger et al. | 370/328 |
| 6,381,233 B1 | * 4/2002 | Sunaga | 370/335 |
| 6,442,153 B1 | * 8/2002 | Dahlman et al. | 370/342 |

FOREIGN PATENT DOCUMENTS

JP   90-555693   2/1995

OTHER PUBLICATIONS

Yano, et al., "Fast Acquisition Scheme for Packet CDMA System" Proceedings of the 1996 Communications Society of Conference of IEICE (Institute of Electronics, Information and Communication Engineers), Sep. 18–21, 1996, Kanazawa University, Kanazawa Japan, 3 pages.

* cited by examiner

Primary Examiner—Frank Duong
Assistant Examiner—Melanie Jagannathan
(74) Attorney, Agent, or Firm—Pillsbury Winthrop LLP (57) ABSTRACT

A base station for a mobile telephone system adopting a code division multiple access method comprising: a first delay profile measuring unit for receiving a random access channel signal, which is input to the base station for setting up a call, detecting at least one peak of the random access channel signal, and detecting the time of receiving the peak of the random access channel signal; and a data channel demodulator which despreads a data channel signal of the call set up by the random access channel signal, based on the peak receiving time of the random access channel signal detected by the first delay profile measuring unit.

18 Claims, 10 Drawing Sheets

BASE STATION

This patent application claims priority based on a Japanese patent application, H11-046729 filed on Feb. 24, 1999, the contents of which are incorporated herein by reference.

BACKGROUND OF THE INVENTION

1. Field of the Invention

The present invention relates to a code division multiple access base station and in particular to a code division multiple access base station and which can process a signal wave having a long delay time.

2. Description of the Related Art

To deal with the variation of the delay time of a received signal, the conventional code division multiple access (CDMA) base station measures the delay profile of a transmission path from a received signal. The delay profile is the response of a signal wave transmitted through different transmission paths received at a base station. Because the signal wave transmits through different paths, the waveform of the signal wave is transformed by the influence of each transmission path. The conventional CDMA base station then selects a plurality of peaks having an effective power level and synthesizes the selected peak to demodulate the received signal.

Figure 1:
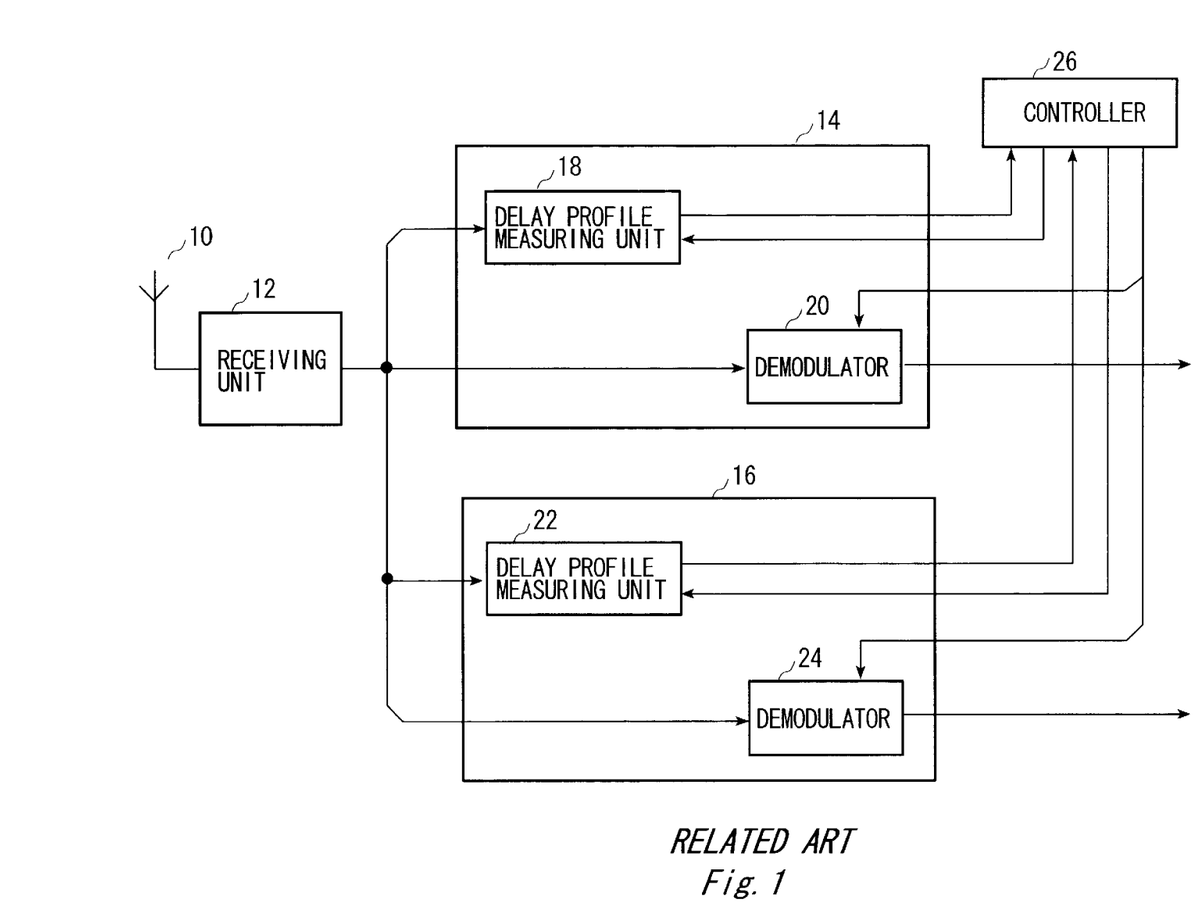
FIG. 1 shows a configuration of a CDMA base station. A CDMA

FIG. 1 shows a configuration of a CDMA base station. A CDMA base station has an antenna 10, a receiving unit 12, a RACH signal receiver 14, a DCH signal receiver 16, and a controller 26. The RACH signal receiver 14 has a delay profile measuring unit 18 and a demodulator 20. The DCH signal receiver 16 has a delay profile measuring unit 22 and a demodulator 24.

The antenna 10 receives a random access channel (PACH) signal and a data channel (DCH) signal which are spread spectrum modulated.

Figure 2:
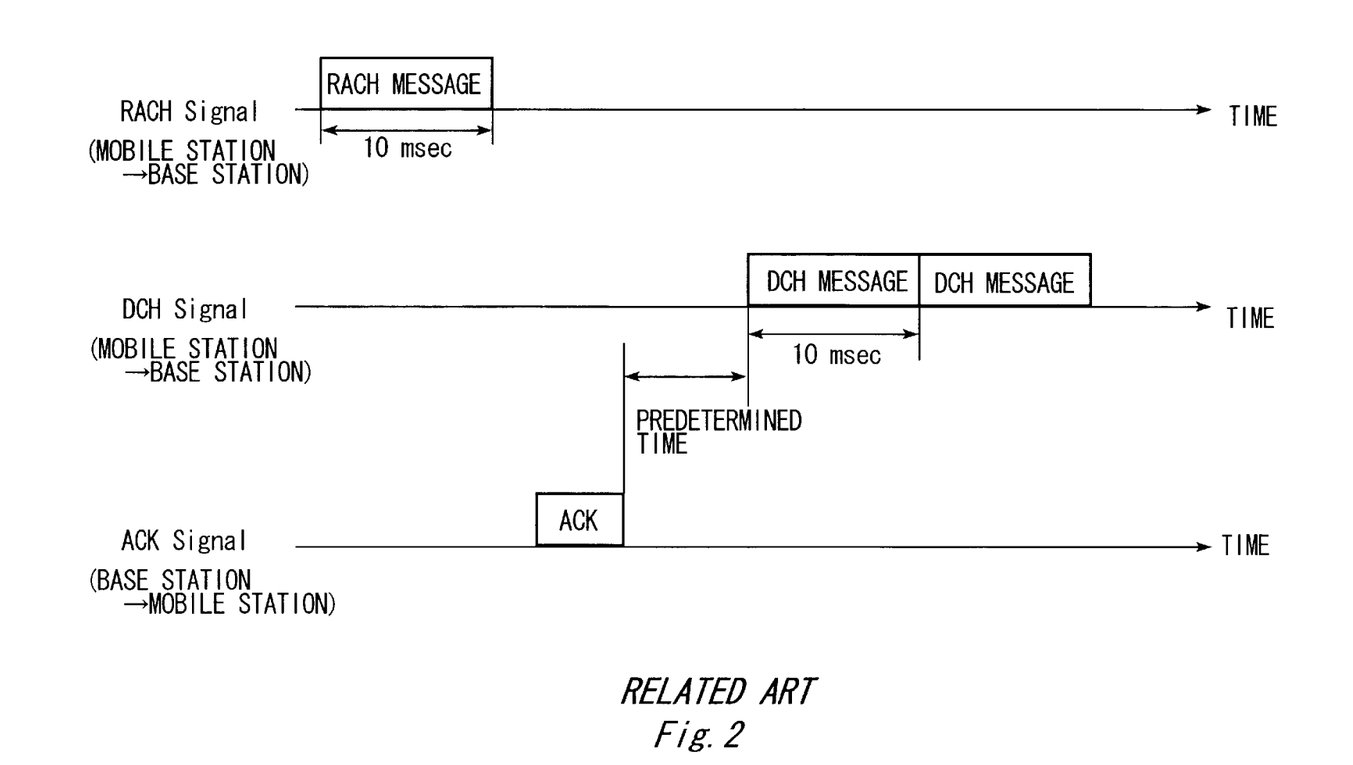
FIG. 2 shows how the RACH signal and the DCH signal are transmitted between the base station and the mobile station.

FIG. 2 shows how the RACH signal and the DCH signal are transmitted between the base station and the mobile station. First, the RACH signal is input to the base station from the mobile station to setup a c all. The RACH signal includes information such as the telephone number and a registration number of the user of the mobile station. Here, as an example, the RACH message of the RACH signal is 10 msec long. The RACH signal is transmitted by burst transmission where the communication is started and finished abruptly.

The ACH signal is then output from the base station to the mobile station. The ACH signal includes the information that the base station has acknowledged the mobile station. Then, the mobile station can start a call and sends the DCH signal to the base station. The DCH signal is a call signal set by the RACH signal. The DCH signal begins at an approximate predetermined time after the transmission of the ACH signal and finishes at a predetermined time after the commencement of the DCH signal transmission. Here, as an example, each DCH message of the DCH signal has a 10 msec time length.

The RACH signal and the DCH signal are complex signals having two-dimensions, namely an I-phase and a Q-phase. The receiving unit 12 converts the frequency of the RACH signal and DCH signal down to a baseband frequency from a carrier wave frequency band, and outputs to the RACH signal receiver 14 and the DCH signal receiver 16, respectively. The RACH signal receiver 14 receives the RACH signal from the receiving unit 12 to despread the RACH signal.

The DCH signal receiver 16 receives the DCH signal from the receiving unit 12 to despread the DCH signal. The delay profile measuring unit 18 detects a peak of the RACH signal from the receiving unit 12 and detects the time of receiving the peak of the RACH signal. The delay profile measuring unit 18 then outputs the detected peak receiving time of the RACH signal to the demodulator 20 through the controller 26. The demodulator 20 despreads the RACH signal received from the receiving unit 12 based on the peak receiving time of the RACH signal detected by the delay profile measuring unit 18. The demodulator 20 then outputs the despread and demodulated RACH signal.

The delay profile measuring unit 22 receives the DCH signal from the receiving unit 12 and detects a peak of the DCH signal and detects the time of receiving the peak of the DCH signal. The delay profile measuring unit 22 then outputs the detected peak receiving time of the DCH signal to the demodulator 20, through the controller 26. The demodulator 24 despreads the DCH signal received from the receiving unit 12 based on the peak receiving time of the DCH signal detected by the delay profile measuring unit 22. The demodulator 24 then outputs the despread and demodulated DCH signal.

The controller 26 sets a type of spreading code and timing of generation of the spreading code for despreading the RACH signal and the DCH signal for the delay profile measuring units 18 and 22. The controller 26 also inputs the peak receiving time of the RACH signal from the delay profile measuring unit 18 and outputs this to the demodulator 20. Furthermore, the controller 26 inputs the peak receiving time of the DCH signal and outputs this to the demodulator 24.

The delay profile measuring units 18 and 22 measures a delay profile with a long delay time, so that the base station can receive various delay signals sent from various places inside the cell region of the base station. During the transmission of the signals, the signals transmit on a different path so that each of the delay profiles has a different delay time. At the same time as measuring the delay profile, the controller 26 notifies the demodulators 20 and 24 of the peak receiving time of the RACH and the DCH signal, so that the demodulators 20 and 24 can despread each RACH signal and DCH signal having various delay times.

Figure 3:
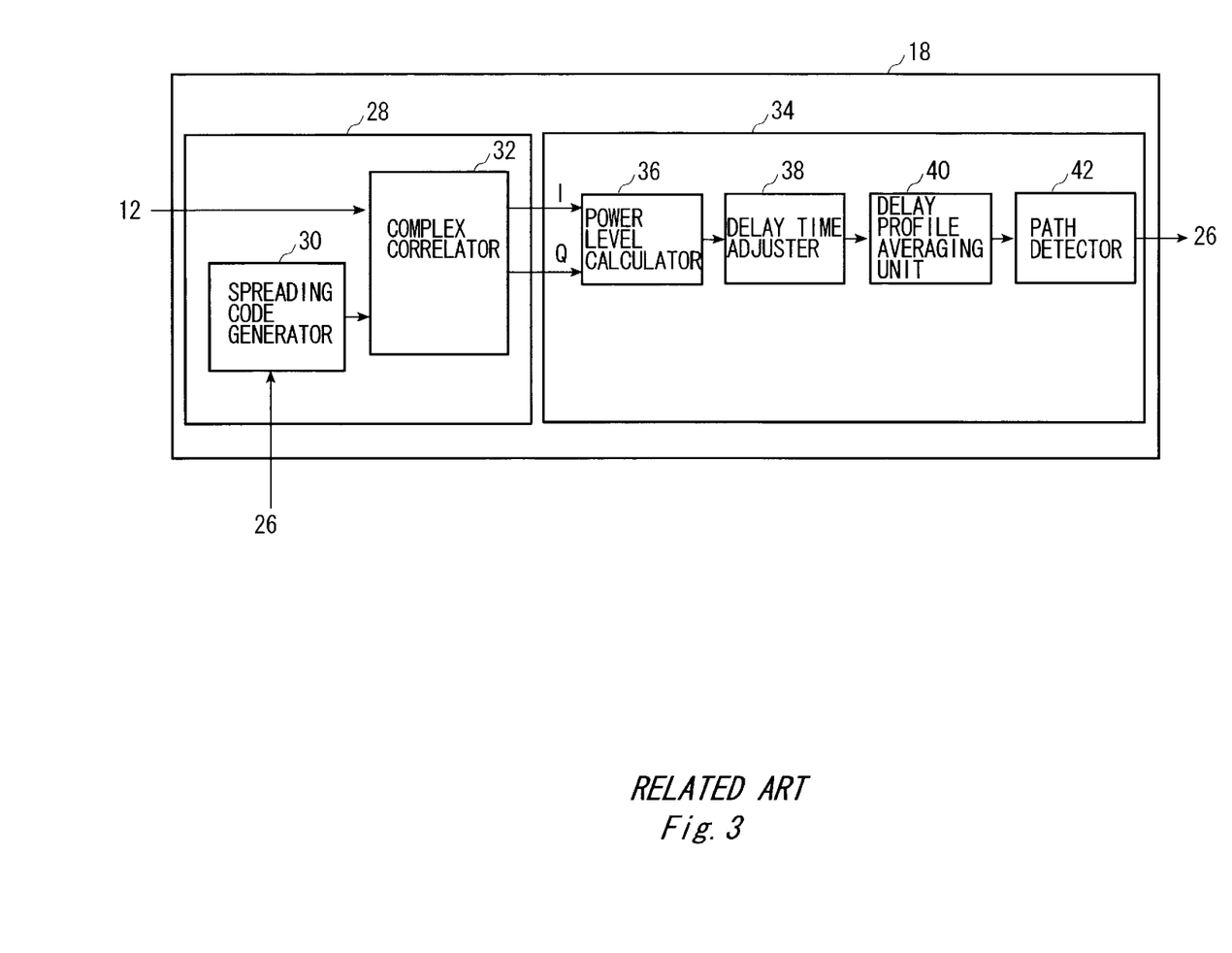
FIG. 3 shows a detailed configuration of a delay profile measuring unit 18.

FIG. 3 shows a detailed configuration of a delay profile measuring unit 18. The delay profile measuring unit 18 can measure a delay profile having a long delay time. The delay profile measuring unit 18 has a RACH signal matched filter 28 and a RACH signal delay profile measuring unit 34. The delay profile measuring unit 18 has a plurality of RACH signal matched filters 28 to despread the RACH signals sent from the plurality of users. Only one RACH signal matched filters 28 is shown in FIG. 3 for simplicity. The RACH signal matched filter 28 has a spreading code generator 30 and a complex correlator 32. The complex correlator 32 may include complex matched filter. The RACH signal delay profile measuring unit 34 has a power level calculator 36, a delay time adjuster 38, a delay profile averaging unit 40, and a path detector 42.

The RACH signal matched filter 28 inputs a RACH signal from the receiving unit 12 and despereads the input RACH signal. The RACH signal delay profile measuring unit 34 detects the peak receiving time of the RACH signal from the despread RACH signal, and outputs the peak receiving time of the RACH signal to the controller 26.

The spreading code generator 30 generates a spreading code and outputs this to the complex correlator 32. The complex correlator 32 despreads the RACH signal using spreading code generated by the spreading code generator 30. Because the RACH signal is a complex signal having an I-phase and a Q-phase, the signal demodulated by the complex correlator 32 is also a complex signal having an I-phase and a Q-phase. The power level calculator 36 calculates the absolute value of a vector in the I-phase and the Q-phase of the demodulated RACH signal, to obtain a power level of the demodulated RACH signal. As a result of the power level calculation, the demodulated RACH signal having an I-phase and a Q-phase two-dimensional data changes to one-dimensional data.

The delay time adjuster 38 adjusts the delay times of a plurality of delay profiles having different delay times, to the same delay time. The delay profile averaging unit 40 has a memory to store the plurality of delay profiles, the delay times of which have been adjusted. The delay profile averaging unit 40 sums each of the peaks of the delay profiles as shown below in FIG. 4, so that the peak can be separated from the noise or interference components.

In this case, it is assumed that the RACH signal is spread spectrum modulated by the 256 chips of the spreading code. To enable the summing of a maximum of 5-symbol periods of the delay time, the delay profile averaging unit 40 has a memory region for 5120 words. Here, 1 chip is equal to 4 words. The 5120 words are obtained by multiplying the 256 chips by the 5 symbols and further multiplying by 4, which is an over sampling number. The path detector 42 detects the peak receiving timing of the RACH signal by detecting the peaks of the RACH signal above the threshold value.

The delay profile measuring unit 22 has the same configuration as the delay profile measuring unit 18. The difference between the delay profile measuring unit 18 and the delay profile measuring unit 22 is the spreading code used for despreading. The spreading code used for the delay profile measuring unit 18 is used for despreading the RACH signal, and the spreading code used for the delay profile measuring unit 22 is used for despreading the DCH signal. As in the delay profile measuring unit 18, the delay profile measuring unit 22 can also measure a delay profile having a long delay time such as 5 symbol periods.

Figure 4:
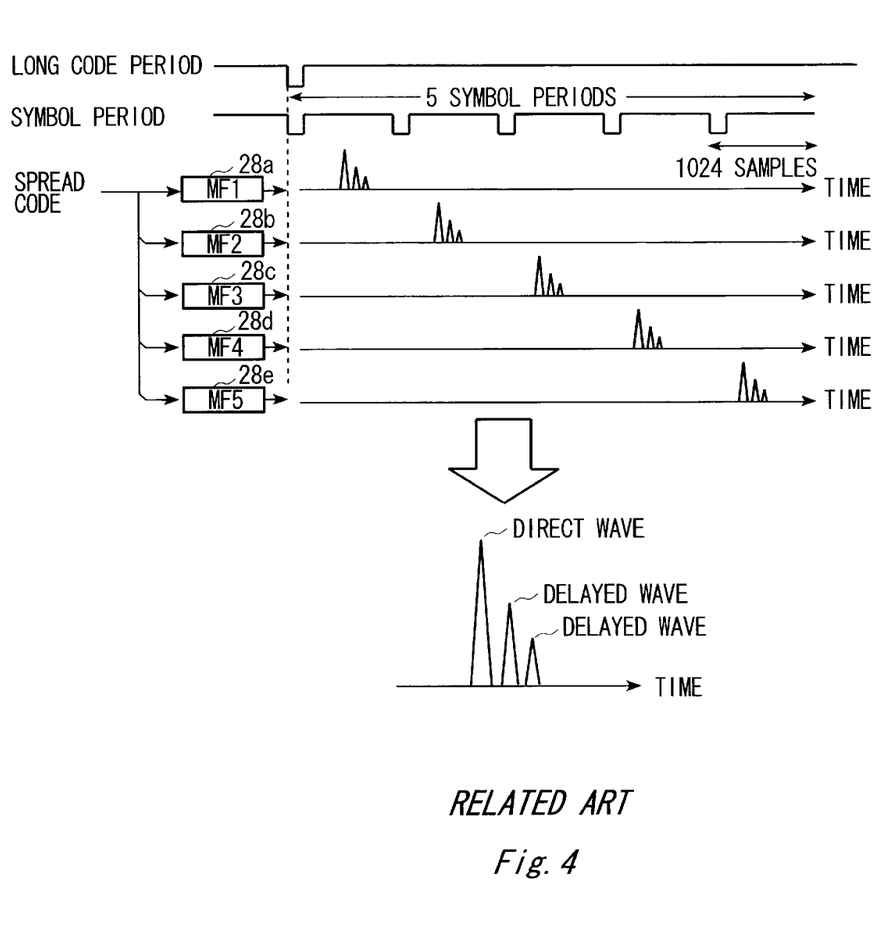
FIG. 4 shows an example of a delay profile of a RACH signal output from a plurality of RACH signal matched filters 28.

FIG. 4 shows an example of a delay profile of a RACH signal output from a plurality of RACH signal matched filters 28. The delay profiles are shown relative to time. Here, the delay profile measuring unit 18 has five RACH signal matched filters 28a, 28b, 28c, 28d, and 28e in parallel, for measuring the delay profile of 5 symbol periods. One symbol period has 1024 samples. The delay profiles shown in FIG. 4 are sent from one mobile station. Because the signal wave sent from a mobile station transmits via various, paths, the base station receives delay profiles having various delay times. In FIG. 4, the output of each of the RACH signal matched filters 28a, 28b, 28c, 28d, and 28d has three peaks, one direct wave and two delayed waves. These three peaks show that the RACH signal is transmitted through three paths. The direct wave is transmitted directly from the mobile station to the base station, and the other two delay waves are transmitted by reflection.

The spreading code of the long code of the first symbol is allotted to the RACH signal matched filter 28a. The spreading code of the long code of the second symbol is allotted to the RACH signal matched filter 28b, and so on. The spreading code is comprised of a long code and a short code. The long code is used for distinguishing the specific mobile station from a plurality of mobile stations. The long code has a long period due to a plurality of symbol periods. Thus, even in the same long code, the code is different by changing the timing of generation of the code. Therefore, the long code allotted to the RACH signal matched filter 28a is different to the long code allotted to the RACH signal matched filter 28b.

By allotting the first symbol of the long code to the RACH signal matched filter 28a for despreading, the first peaks emerge in the first symbol period. By allotting the second symbol of the long code to the RACH signal matched filter 28b for despreading, the second peaks emerge in the second symbol period, and so on. Therefore, the delay profile measuring unit 18 can measure the peaks of the RACH signal emerging during the 5 symbol periods.

The delay time adjuster 38 then delays the first peak for four symbol periods, delays the second peak for three symbol periods, delays the third peak for two symbol periods, and delays the forth peak for one symbol period. Therefore, all the peaks of the delay profiles have the same delay time for the four symbol periods. Then, each of the peaks of the five delay profiles is summed by the delay profile averaging unit 40. The peak of the direct waves of each of the delay profiles are summed. The peaks of the first delayed waves of each of the delay profiles are summed separately to the direct waves and the second delay waves. The peaks of the second delayed waves of each of the delay profiles are summed separately to the direct waves and the first delay waves. The delay profile shown below the arrow in FIG. 4 is a result of the summing of the five delay profiles.

The conventional delay profile measuring unit 22 has five signal matched filters in parallel, to measure the delay profile for five symbol periods as in the delay profile measuring unit 18. Furthermore, the delay profile averaging unit of the delay profile measuring unit 22 must have a memory region of a total of 25600 words, to store the five delay profiles for five symbol periods. Furthermore, to detect the peaks from the 5120 words, all 5120 words must be retrieved. If the path detector 42 is comprised of a digital signal processor, the path detector 42 has to process an enormous volume of data at high speed because the path detector 42 has to retrieve all 5120 words in order to detect the peaks.

SUMMARY OF THE INVENTION

Therefore, it is an object of the present invention to provide a code division multiplex receiver which overcomes the above issues in the related art. This object is achieved by combinations described in the independent claims. The dependent claims define further advantageous and exemplary combinations of the present invention.

According to the first aspect of the present invention, a base station for a mobile telephone system adopting a code division multiple access method can be provided. The base station may comprise a first delay profile measuring unit for receiving a random access channel signal, which is input to the base station for setting up a call, detecting at least one peak of the random access channel signal, and detecting a time of receiving the peak of the random access channel signal; and a data channel demodulator which despreads a data channel signal of the call set up by the random access channel signal based on the peak receiving time of the random access channel signal detected by the first delay profile measuring unit.

The base station can be provided such that the base station further comprises a second delay profile measuring unit which receives the data channel signal, detects at least one peak of the data channel signal, and detects a receiving time of the peak of the data channel signal based on the peak receiving time of the random access channel signal; and the data channel demodulator despreads the data channel signal based on the peak receiving time of the data channel signal detected by the second delay profile measuring unit.

The first delay profile measuring unit may have a first path detector which detects the peak receiving time of the random access channel signal and may output the detected peak receiving time to the second delay profile measuring unit. The second delay profile measuring unit may have a spreading code generator which generates a spreading code for despreading the data channel signal based on the peak receiving time of the random access channel signal; and the first path detector may provide to the spreading code generator the peak receiving time of the random access channel signal.

The base station may further comprises a controller which inputs the peak receiving time of the random access channel signal from the first delay profile measuring unit and outputs to the second delay profile measuring unit. The second delay profile measuring unit may have a spreading code generator which generates a spreading code for despreading the data channel signal based on the peak receiving time of the random access channel signal.

The base station can be provided such that the spreading code generator may sequentially generate a plurality of the spreading codes, each of which corresponds to the data channel signal of each of a plurality of symbol periods, based on the peak receiving time of the random access channel signal. The second delay profile measuring unit may further have: a complex correlator which despreads the data channel signal of the plurality of symbol periods using the plurality of spreading codes generated by the spreading code generator; a delay profile averaging unit which stores the despread data channel signal of the plurality of symbol periods and sums each of the stored data channel signals of the plurality of symbol periods; and a second path detector which detects the peak receiving time of the data channel signal from the summed data channel signal.

The spreading code generator may start generating the spreading code when receiving the peak of the random access channel signal. The delay profile averaging unit may start storing the despread data channel signal based on the peak receiving time of the random access channel signal. The first delay profile measuring unit may receive a plurality of the random access channel signals, detects at least one peak for each of the plurality of the random access channel signals, and detects the peak receiving time for each of the plurality of the random access channel signals.

According to the second aspect of the present invention, a method of processing a received signal for a mobile telephone system adopting a code division multiple access method can be provided. The method comprises steps of receiving a random access channel signal for setting up a call; detecting at least one peak of the random access channel signal; detecting a time of receiving the peak of the random access channel signal; and despreading a data channel signal of the call set by the random access channel signal based on the peak receiving time of the random access channel signal.

The method may further comprises steps of receiving the data channel signal; detecting at least one peak of the data channel signal; and detecting a receiving time of the peak of the data channel signal based on the peak receiving time of the random access channel signal; and despreading the data channel signal based on the peak receiving time of the data channel signal. The peak detecting step of the data channel signal may generate a spreading code for despreading the data channel signal based on the peak receiving time of the random access channel signal.

The method can be provided such that the peak detecting of the data channel signal may sequentially generate a plurality of spreading codes, each of which corresponds to the data channel signal of each of a plurality of symbol periods, based on the peak receiving time of the random access channel signal. The peak detecting of the data channel signal may: despread the data channel signal of the plurality of symbol periods using the plurality of spreading codes generated by the spreading code generating; store the despread data channel signals of the plurality of symbol periods; sum each of the stored data channel signals of the plurality of symbol periods; and detect the peak of the data channel signal from the summed data channel signal.

The spreading code generating step may start generating the spreading code when receiving the peak of the random access channel signal. The data channel signal storing step may start storing the despread data channel signal based on the peak receiving time of the random access channel signal.

This summary of the invention does not necessarily describe all necessary features so that the invention may also be a sub-combination of these described features.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 5:
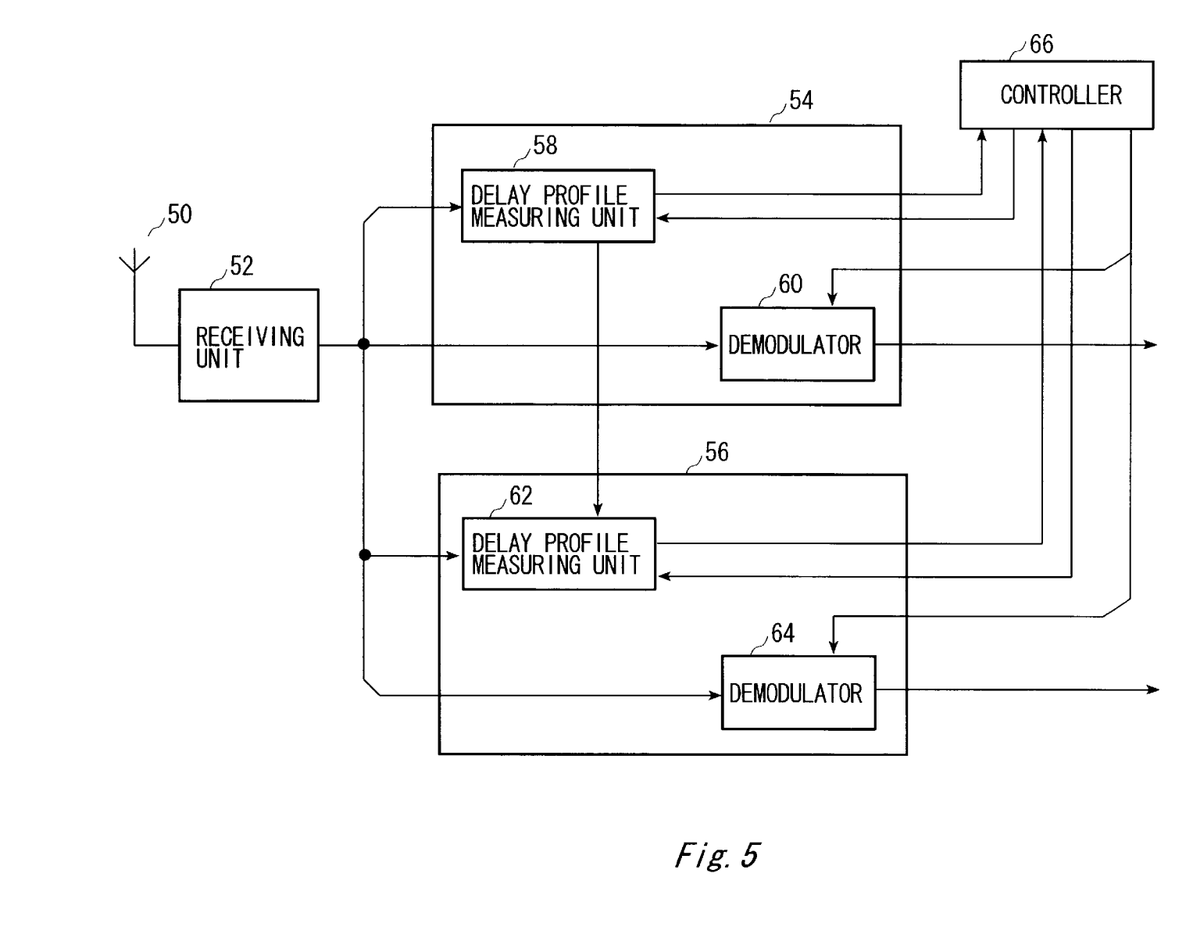
FIG. 5 shows a configuration of a CDMA base station of the present invention.

FIG. 5 shows a configuration of a CDMA base station of the present invention. The CDMA base station has an antenna 50, a receiving unit 52, a RACH signal receiver 54, a DCH signal receiver 56, and a controller 66. The RACH signal receiver 54 has a delay profile measuring unit 58 and a demodulator 60. The DCH signal receiver 56 has a delay profile measuring unit 62 and a demodulator 64.

The antenna 50 receives a RACH signal and a DCH signal which are spread spectrum modulated. The signal is a complex signal having the two-dimensions of an I-phase and a Q-phase. The receiving unit 52 converts the frequency of a received signal down to a baseband frequency from a carrier wave frequency band, and outputs to the RACH signal receiver 54 and the DCH signal receiver 56. The RACH signal receiver 54 receives a plurality of RACH signals sent from the plurality of users in order to despread and demodulate the RACH signals. The DCH signal receiver 56 also receives a plurality of DCH signals sent from the plurality of users in order to despread and demodulate the DCH signals.

The delay profile measuring unit 58 receives a RACH signal from the receiving unit 52 and detects the peak of the RACH signal and further detects the receiving time of the peak of the RACH signal. The delay profile measuring unit 58 then outputs the peak receiving time of the RACH signal to the demodulator 60 through the controller 66. The delay profile measuring unit 58 also outputs the peak receiving time of the RACH signal to the delay profile measuring unit 62. The demodulator 60 inputs a plurality of RACH signals sent from the plurality of users from the receiving unit 52, and despreads the RACH signal based on the peak receiving time of the RACH signal detected by the delay profile measuring unit 58.

The delay profile measuring unit 62 inputs the DCH signal and detects the peak of the DCH signal and further detects the receiving time of the peak of the DCH signal based on the peak receiving time of the RACH signal input from the delay profile measuring unit 58. The delay profile measuring unit 62 then outputs the peak receiving time of the DCH signal to the demodulator 64 through the controller 66. The demodulator 64 despreads a plurality of DCH signals sent from the plurality of users, based on the peak receiving time of the DCH signal detected by the delay profile measuring unit 62.

The controller 66 sets the type of spreading code and timing of generation of the spreading code for the delay profile measuring unit 58 and 62, used for despreading the RACH signal and the DCH signal sent from the plurality of users. The controller 66 also inputs the peak receiving time of the RACH signal from the delay profile measuring unit 58 and outputs to the demodulator 60. The controller 66 inputs the peak receiving time of the DCH signal and outputs to the demodulator 64.

Figure 6:
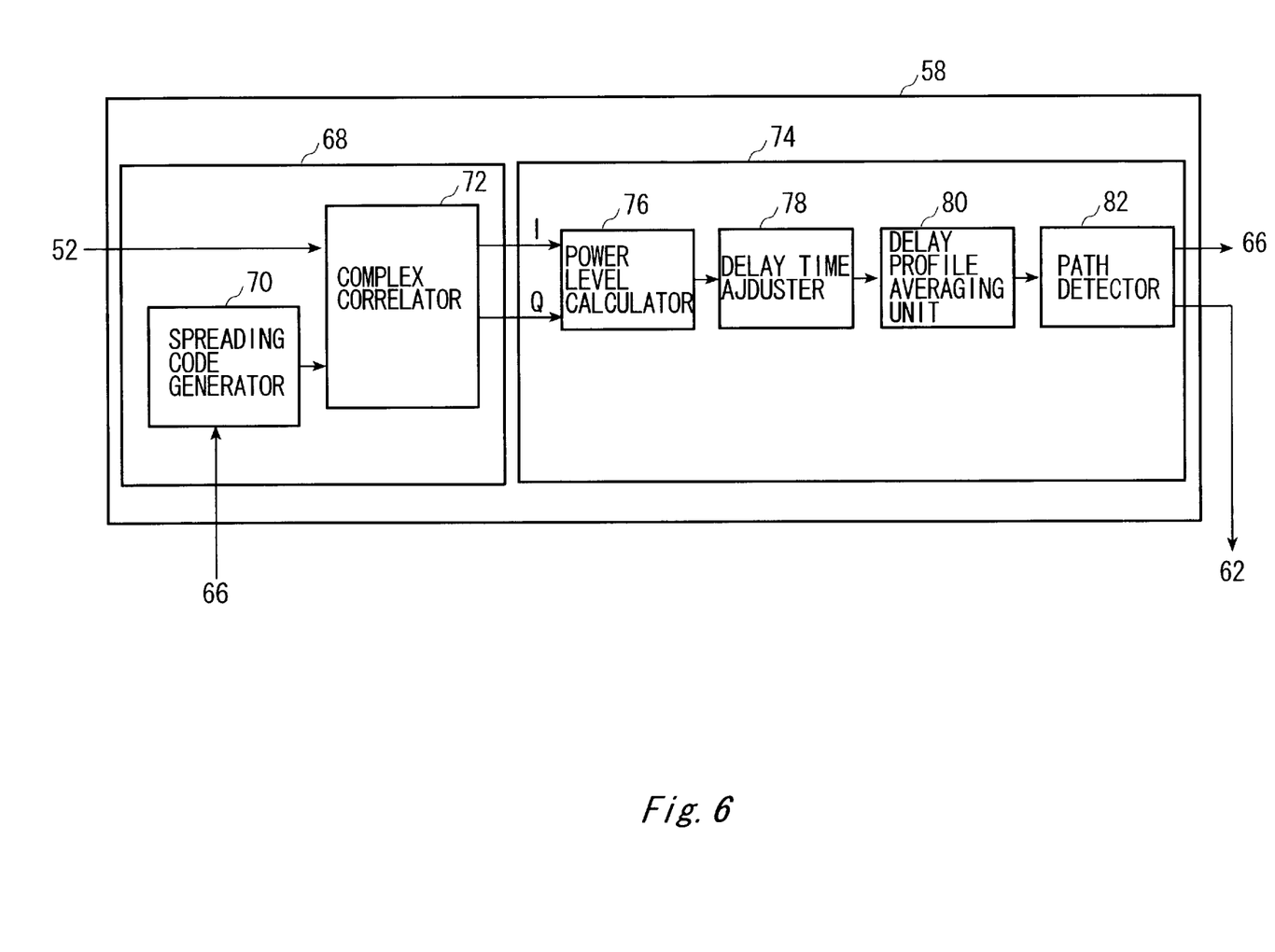
FIG. 6 shows a detailed configuration of a delay profile measuring unit 58.

FIG. 6 shows a detailed configuration of a delay profile measuring unit 58. The delay profile measuring unit 58 has a RACH signal matched filter 68 and a RACH signal delay profile measuring unit 74. The delay profile measuring unit 58 has a plurality of RACH signal matched filters 68 to despread the RACH signals sent from the plurality of users. Only one RACH signal matched filters 68 is shown in FIG. 6 for simplicity. The RACH signal matched filter 68 has a spreading code generator 70 and a complex correlator 72. The complex correlator 72 may include complex matched filter. The RACH signal delay profile measuring unit 74 has a power level calculator 76, a delay time adjuster 78, a delay profile averaging unit 80, and a path detector 82.

The RACH signal matched filter 68 inputs a RACH signal to despread the RACH signal and outputs the despread RACH signal to the RACH signal delay profile measuring unit 74. The RACH signal delay profile measuring unit 74 detects the peak receiving time of the RACH signal from the despread RACH signal and outputs to the controller 66 and the delay profile measuring unit 62.

The spreading code generator 70 generates a spreading code based on the peak receiving time of the RACH signal input from the delay profile measuring unit 58 and outputs this to the complex correlator 72. The complex correlator 72 despreads the RACH signal received from the receiving unit 52 using the spreading code generated by the spreading code generator 70. Because the RACH signal is a complex signal having an I-phase and a Q-phase, the signal demodulated by the complex correlator 72 is also a complex signal having an I-phase and a Q-phase. The power level calculator 76 calculates the absolute value of a vector in the I-phase and Q-phase of the demodulated RACH signal, to obtain the power level of the demodulated RACH signal. As a result of the power level calculation, the demodulated RACH signal having I-phase and Q-phase two-dimensional data changes to one-dimensional data. Instead of the method shown above, other methods can be used for conversion of two-dimensional data signals to one-dimensional data signals.

The delay time adjuster 78 adjusts the delay time of a plurality of delay profiles having different delay times, to the same delay time. The delay profile averaging unit 80 has a memory to store a plurality of delay profiles, the delay times of which have been adjusted. The delay profile averaging unit 80 sums up each of the peaks of the delay profiles as shown below in FIG. 9, so that peaks of the RACH signal can be separated from the noise or interference components. The path detector 82 detects the peak receiving time of the RACH signal by selecting at least one peak above the threshold value from the delay profile averaged by the delay profile averaging unit 80.

Figure 7:
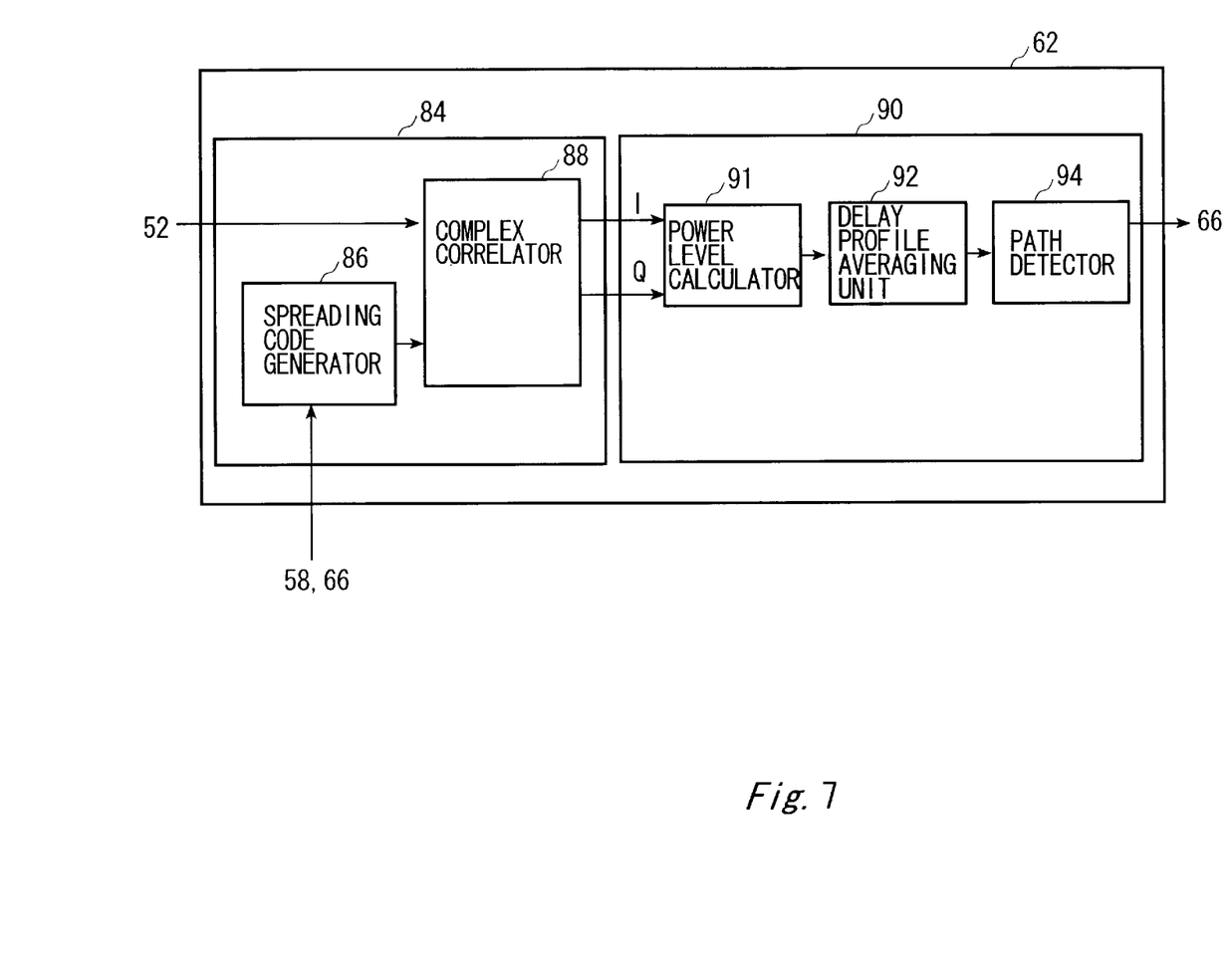
FIG. 7 shows a detailed configuration of a delay profile measuring unit 62.

FIG. 7 shows a detailed configuration of a delay profile measuring unit 62. The delay profile measuring unit 62 has a DCH signal matched filter 84 and a DCH signal delay profile measuring unit 90. Here, the delay profile measuring unit 62 has one DCH signal matched filter 84. The DCH signal matched filter 84 has a spreading code generator 86 and a complex correlator 88. The complex correlator 88 may include complex matched filter. The DCH signal delay profile measuring unit 90 has a power level calculator 91, a delay profile averaging unit 92, and a path detector 94.

The spreading code generator 86 inputs the peak receiving time of the RACH signal from the delay profile measuring unit 58. The spreading code generator 86 generates the spreading code based on the peak receiving time of the RACH signal provided from the delay profile measuring unit 58. In other words, the spreading code generator 86 generates the spreading code when receiving the peak of the RACH signal. Therefore, the delay profile measuring unit 62 detects the peak receiving time of the DCH signal based on the peak receiving time of the RACH signal. Here, the delay profile measuring unit 58 has a direct electrical connection to the delay profile measuring unit 62. However, the peak receiving time of the RACH signal can also be provided to the delay profile measuring unit 62 from the delay profile measuring unit 58 through the controller 66.

The complex correlator 88 despreads the DCH signal received from the receiving unit 52, using the spreading code generated by the spreading code generator 86. Because the DCH signal is a complex signal having an I-phase and a Q-phase, the signal demodulated by the complex correlator 88 is also a complex signal having an I-phase and a Q-phase. The power level calculator 91 calculates the absolute value of a vector in the I-phase and Q-phase of the demodulated DCH signal, to obtain the power level of the demodulated DCH signal. As a result of the power level calculation, the demodulated DCH signal having I-phase and Q-phase two-dimensional data changes to one-dimensional data. Instead of the method shown above, other methods can be used for conversion of two-dimensional data signals to one-dimensional data signals.

The delay profile averaging unit 92 has a memory to store the delay profile of the DCH signal. The delay profile averaging unit 92 sums up each of the peaks of the delay profiles as shown below in FIG. 10. The path detector 94 detects the peak receiving time of the DCH signal by selecting at least one peak above the threshold value from the delay profile averaged by the delay profile averaging unit 92.

Figure 8:
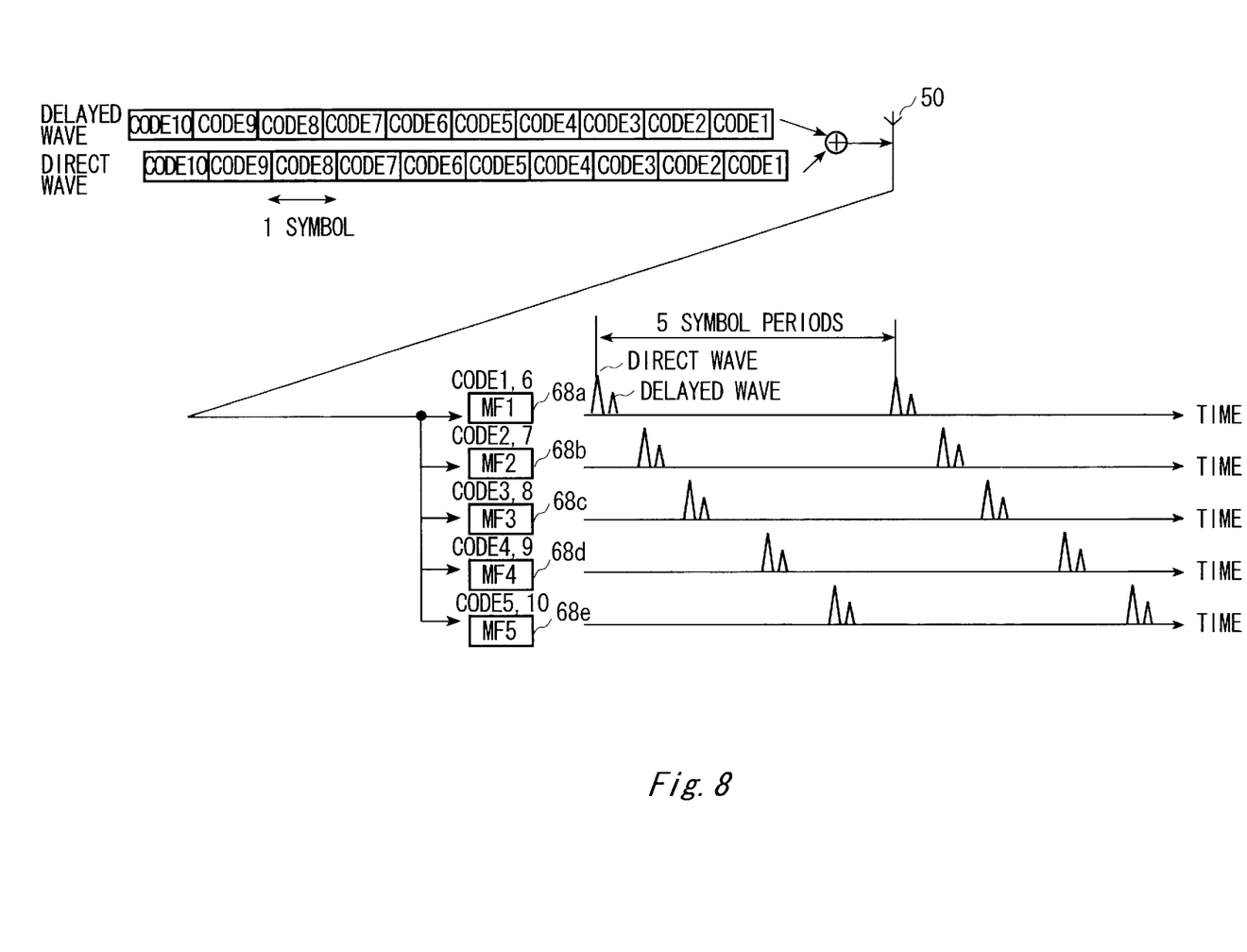
FIG. 8 shows an example of the delay profile output from the RACH signal matched filters 68a, 68b, 68c, 68d, and 68e.

FIG. 8 shows an example of the delay profile output from the RACH signal matched filters 68a, 68b, 68c, 68d, and 68e in parallel. The delay profiles for ten symbol periods are shown in FIG. 8. Here, the delay profile measuring unit 58 has five RACH signal matched filters 68a, 68b, 68c, 68d, and 68e. The signal wave transmitted through the two paths are shown in FIG. 8, that is, one direct wave and one delayed wave. First, the direct wave of the RACH signal is input to the antenna 50. The direct wave is spread spectrum modulated by the spreading code of code 1 through to code 10. Each of code 1 through to code 10 is multiplied with the RACH signal of each of the plurality of signal periods.

For example, the first symbol period of the RACH signal, signal 1, is multiplied with code 1, and the second symbol period of the RACH signal is multiplied with code 2. Then, each of the symbol periods of the RACH signal is spread spectrum modulated by the different spreading codes. Each of the codes has a time length of one symbol period. Next, the delayed wave is input to antenna 50 with some delay time with the direct wave. The delayed wave is also spread spectrum modulated by the spreading code of code 1 through code 10.

Next, the direct wave and the delayed wave are despread by each of the RACH signal matched filters 68a, 68b, 68c, 68d, and 68e. Codes 1 and 6 are provided to the RACH signal matched filter 68a. Codes 2 and 7 are provided to the RACH signal matched filter 68b. Codes 3 and 8 are provided to the RACH signal matched filter 68c. Codes 4 and 9 are provided to the RACH signal matched filter 68d. Codes 5 and 10 are provided to the RACH signal matched filter 68e. Then, the RACH signal matched filter 68a despreads each of the direct wave and the delayed wave using code 1 and code 6. Therefore, the pair of the direct wave and the delayed wave, which are despread by code 1 emerge at the first symbol period. Then, the pair of the direct wave and the delayed wave, which are despread by the code 6 emerge at the sixth symbol period. The pair of the direct wave and the delayed wave despread by codes 1 and 6 have a time interval of five symbol periods because there is a time interval of five symbol periods between the code 1 and the code 6.

Similarly, the pair of the direct wave and the delayed wave, which are despread by the codes 2 and 7 emerge at the second symbol period and the seventh symbol period. The pair of the direct wave and the delayed wave, which are despread by the codes 3 and 8 emerge at the third symbol period and the eighth symbol period. The pair of the direct wave and the delayed wave, which are despread by the codes 4 and 9 emerge at the forth symbol period and the ninth symbol period. Finally, the pair of the direct wave and the delayed wave, which are despread by the codes 5 and 10 emerge at the fifth symbol period and the tenth symbol period.

Figure 9:
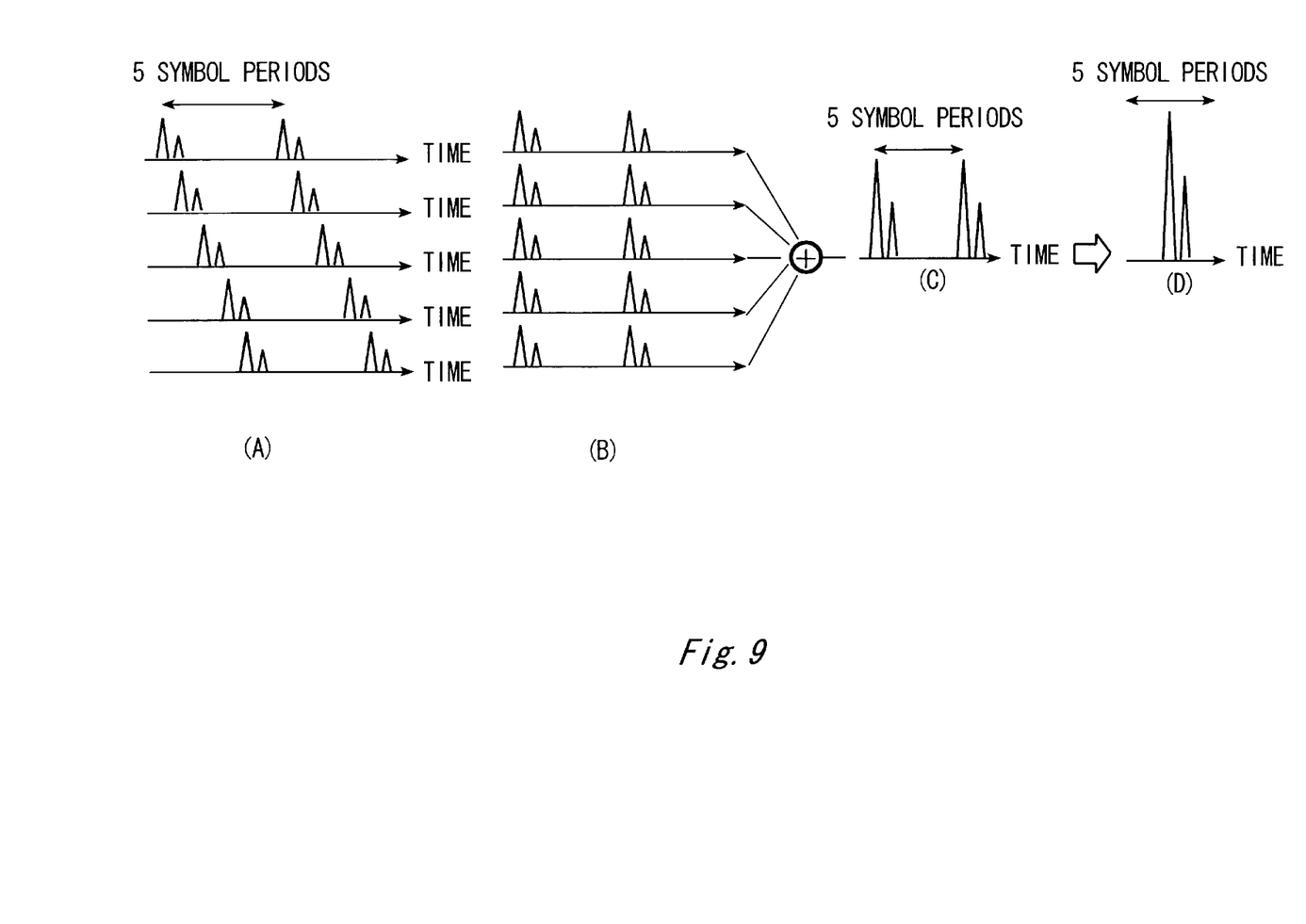
FIG. 9 shows the procedure of averaging the delay profiles shown in FIG. 8.

FIG. 9 shows the procedure of averaging the delay profiles shown. in FIG. 8. FIG. 9(A) shows the output of the power level calculator 76. The outputs of the RACH signal matched filters 68a, 68b, 68c, 68d, and 68e are the calculated power levels calculated by the power level calculator 76. Because the RACH signal has a value of −1 or 1, and because the power level calculator calculates the absolute value by calculating the square of the RACH signal, all the values of the RACH signals become 1. Therefore, the output of the power level calculator 76 becomes the power, which shows whether the spreading code generated by the spreading code generator 70 is matched with the spreading code of the transmitted signal. If the spreading code of the spreading code generator and the spreading code of the wave signal are matched, the peak of the power appears in the delay profile.

FIG. 9(B) shows the output of the delay time adjuster 78. The delay profile of the RACH signal despread by the codes 1 and 6 is delayed for four symbol periods. The delay profile of the RACH signal despread by the codes 2 and 7 is delayed for three symbol periods. The delay profile of the RACH signal despread by the codes 3 and 8 is delayed for two symbol periods. The delay profile of the RACH signal despread by the codes 4 and 9 is delayed for one symbol period. In this way, all the delay profiles are located in the fifth symbol period.

FIG. 9(C) and FIG. 9(D) shows the output of the delay profile averaging unit 80. The five delay profiles shown in FIG. 9(B) are summed at the same sample period in the same symbol period, then two pair of delay profiles having two peaks of the direct wave and the delay wave can be obtained as shown in FIG. 9(C). Next, the pair of peaks is summed in such a way that each of the peaks is summed at the same sample period in each of the symbol periods. Therefore, as shown in FIG. 9(D), one pair of peaks of the direct wave and the delay wave is obtained. Then, the delay profile measuring unit 58 advance the delay profile for four symbol periods so that the delay profile is located at the first symbol period. Finally, the peak receiving time of the RACH signal is detected using the summed delay profile shown in FIG. 9(D).

Figure 10:
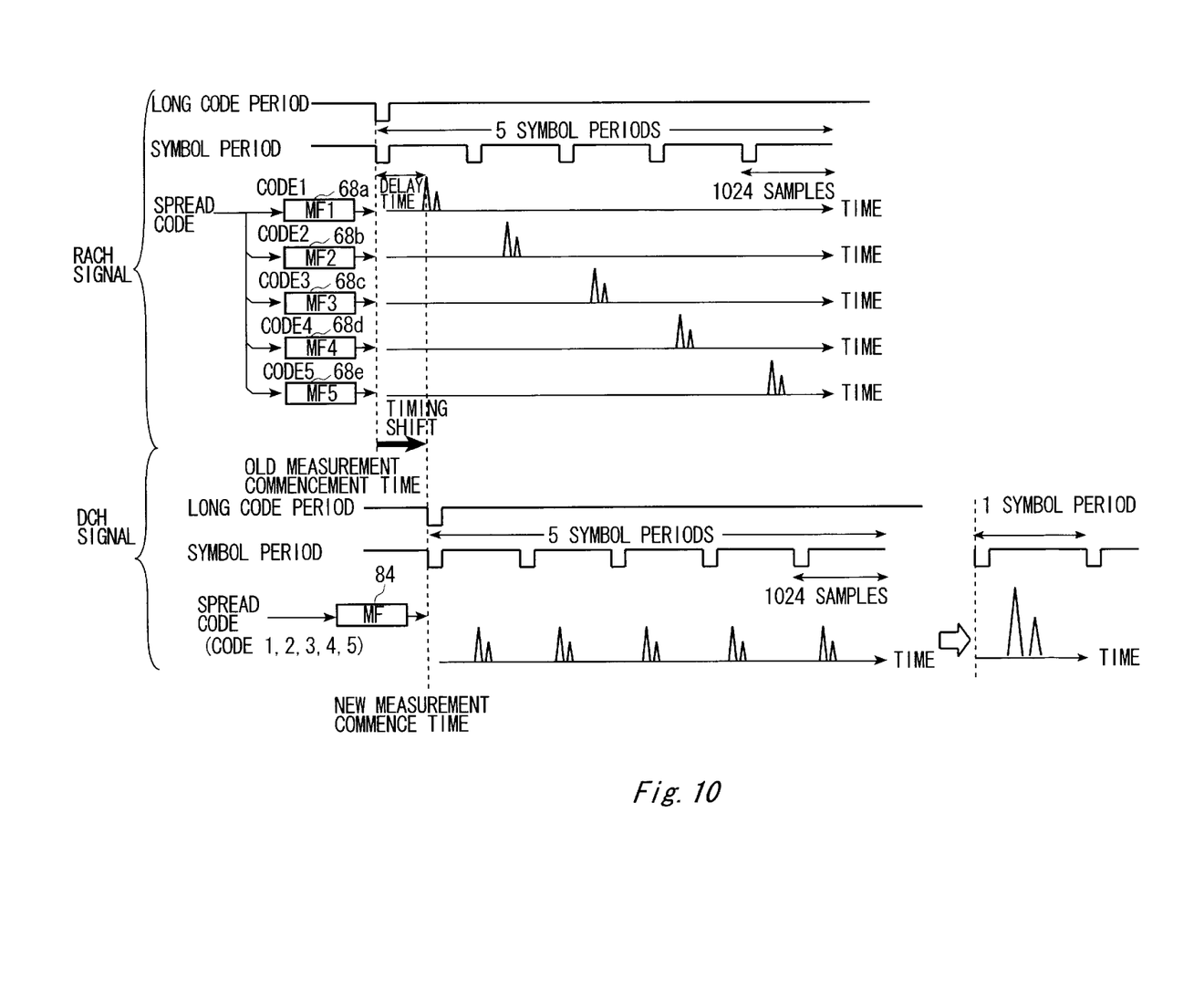
FIG. 10 shows an example of the delay profiles of the RACH signal and the delay profile of the DCH signal obtained by using the peak receiving time of the RACH signal.

FIG. 10 shows an example of the delay profiles of the RACH signal and the delay profile of the DCH signal obtained using the peak receiving time of the RACH signal. Here, the delay profiles for five symbol periods are shown in FIG. 10. As for FIG. 8, five delay profiles are output from the five RACH signal matched filters 68a, 68b, 68c, 68d, and 68e. The first delay profile of the RACH signal is input to the RACH signal matched filter 68a with the delay time shown in FIG. 10. The DCH signal matched filter 84 shifts the timing of generation of the spreading code based on the peak receiving time of the RACH signal, here shown as the delay time at the output of the RACH signal matched filter 68a. Thus, the DCH signal matched filter 84 starts despreading the DCH signal at the new measurement commencement time.

The spreading codes of the codes 1 through to code 5 are sequentially generated by the DCH signal matched filter 84. Here, the codes 1 through to code 5 of the DCH signal are different from the codes 1 through to code 5 used for the RACH signal. The DCH signal matched filter 84 despreads the DCH signal using the codes 1 through to code 5, so that the five pairs of peaks emerge at each of the symbol periods. Then, the power level of each of the delay profiles is calculated in the power level calculator 91. Next, the delay profile averaging unit 92 sums the peaks at the same sample period for each of the symbol periods. Therefore, the peaks of the direct waves are summed together, and the peaks of the delayed waves are summed together, separately from the peaks of the direct wave. Then, the delay profile shown on the right-hand side of the arrow in FIG. 10 can be obtained, having the two peaks of the direct wave and the delayed wave.

In the case of the delay profile measuring unit 58, the arrival time of the RACH signal is unknown. For example, FIG. 8 shows an example where the direct wave modulated by the code 1 is input to the base station first. However, it is usually not known which signal is input to the base station first. Therefore, the delay profile measuring unit 58 has five RACH signal matched filters so that the delay profile measuring unit 58 can wait for five symbol periods for the RACH signal having the same spreading code as the spreading code of the RACH signal matched filter 58.

Contrary to the above, because the delay profile measuring unit 62 uses the peak receiving time of the RACH signal, the delay profile measuring unit 62 can know which DCH signal will be arriving. Therefore, the delay profile measuring unit 62 does not have to have a plurality of matched filters to wait for the DCH signal modulated with the spreading code that matches with the spreading code of the matched filter. Furthermore, the delay profile averaging unit 92 has to store only the data output from one DCH signal matched filter 84, so the quantity of data to be stored can be reduced. The result is, the size of the memory inside the delay profile averaging unit 92 can be reduced.

Furthermore, the delay time adjuster becomes unnecessary in the DCH signal delay profile measuring unit 90 because there is only one DCH signal matched filter 84 in the DCH signal delay profile measuring unit 90. The DCH signal matched filter 84 searches the peak receiving time of the DCH signal from the time region of peak receiving time of the RACH signal as a center, to within half a symbol period, for example.

If the capacity of the memory necessary for the delay profile averaging unit 92 is 1024 words, the capacity of the memory necessary for the conventional delay profile averaging unit 40 is 5120 words. Therefore, the capacity of the memory necessary for the delay profile averaging unit 92 is greatly reduced. Also, since the delay profile measuring unit 62 does not need the delay time adjuster, the structure of the delay profile measuring unit 62 can be simplified. Furthermore, because the path detector 94 can detect the peak of the DCH signal from the 1024 words of data, the quantity of data to be processed for peak detection is greatly reduced.

Although the present invention has been described by way of exemplary embodiments, it should be understood that many changes and substitutions may be made by those skilled in the art without departing from the spirit and the scope of the present invention which is defined only by the appended claims.

What is claimed is:

1. A base station for a mobile telephone system utilizing code division multiple access (CDMA) comprising:
   a first delay profile measuring unit for receiving a random access channel signal, which is input to the base station for setting up a call, detecting at least one peak of the random access channel signal, and determining a first peak time defined by receiving the peak of the random access channel signal;
   a data channel demodulator which despreads a data channel signal by the random access channel signal based on the first peak time determined by the first delay profile measuring unit; and
   a second delay profile measuring unit which receives the data channel signal, detects at least one peak of the data channel signal, and determines a second peak time defined by the peak of the data channel signal based on the first peak time, wherein
   the data channel demodulator despreads the data channel signal based on the second peak time determined by the second delay profile measuring unit, and
   the first delay profile measuring unit has a first path detector which detects the first peak time and outputs it to the second delay profile measuring unit.

2. A base station as claimed in claim 1, wherein:
   the second delay profile measuring unit has a spreading code generator which generates a spreading code for despreading the data channel signal based on the first peak time; and
   the first path detector provides to the spreading code generator the first peak time.

3. A base station as claimed in claim 1 further comprising:
   a controller which inputs the first peak time from the first delay profile measuring unit and outputs to the second delay profile measuring unit.

4. A base station as claimed in claim 1, wherein the second delay profile measuring unit has a spreading code generator which generates a spreading code for despreading the data channel signal based on the first peak time.

5. A base station as claimed in claim 4, wherein the spreading code generator sequentially generates a plurality of spreading codes, each of which corresponds to the data channel signal of each of a plurality of symbol periods, based on the first peak time.

6. A base station as claimed in claim 5 wherein the second delay profile measuring unit further has:
   a complex correlator which despreads the data channel signal of the plurality of symbol periods using the plurality of spreading codes generated by the spreading code generator;
   a delay profile averaging unit which stores the despread data channel signals of the plurality of symbol periods and sums stored data channel signals of the plurality of symbol periods to form a summed data channel signal; and
   a second path detector which determines the second peak time from the summed data channel signal.

7. A base station as claimed in claim 4, wherein the spreading code generator starts generating the spreading code when receiving the peak of the random access channel signal.

8. A base station as claimed in claim 6, wherein the delay profile averaging unit starts storing the despread data channel signal of the plurality of symbol periods based on the first peak time.

9. A base station as claimed in claim 6, wherein the first delay profile measuring unit receives a plurality of random access channel signals, detects at least one peak for each such random access channel signal, and detects a plurality of peak receiving times associated with respective random access channel signals; and
   the second delay profile measuring unit has a plurality of spreading code generators, each of which generates a plurality of spreading codes, based on each of the plurality of peak receiving times of the random access channel signals.

10. A base signal as claimed in claim 9, wherein:
    the second delay profile measuring unit further has:

a plurality of complex correlators which receives each of a plurality of data channel signals of the plurality of symbol periods and despreads each data channel signal of the plurality of symbol periods using one of the spreading codes generated by each of the spreading code generators;

the delay profile averaging unit which stores the plurality of despread data channel signals of the plurality of symbol periods and sums stored data channel signals at a same time in each of the plurality of symbol periods; and the second path detector which detects the peak receiving time for each of the plurality of data channel signals from each of the plurality of summed data channel signals.

11. A method of processing a received signal for a mobile telephone system utilizing code division multiple access (CDMA), comprising:

receiving a random access channel signal for setting up a call;

detecting at least one peak of the random access channel signal;

determining a first peak time defined by receiving the peak of the random access channel signal and outputting it to a profile measuring unit;

despreading a data channel signal based on the first peak time;

receiving a data channel signal;

determining at least one peak of the data channel signal; and determining a second peak time corresponding to receiving the peak of the data channel signal based on the first peak time; and despreading the data channel signal based on the second peak time.

12. A method as claimed in claim 11, wherein peak detecting of the data channel signal generates a spreading code for despreading the data channel signal based on the first peak time.

13. A method as claimed in claim 12, wherein peak detecting of the data channel signal generates a plurality of spreading codes, each of which corresponds to the data channel signal of each of a plurality of symbol periods, based on the first peak time.

14. A method of processing a received signal for a mobile telephone system utilizing code division multiple access (CDMA), comprising:

receiving a random access channel signal for setting up a call;

detecting at least one peak of the random access channel signal;

determining a first peak time corresponding to receiving the peak of the random access channel signal and outputting it to a profile measuring unit;

receiving a data channel signal;

despreading the data channel signal based on the first peak time;

determining at least one peak of the data channel signal;

determining a second peak time corresponding to receiving the peak of the data channel signal;

despreading the data channel signal based on the second peak time;

wherein peak detecting of the data channel signal generates a spreading code for despreading the data channel signal based on the peak of the random access channel signal, wherein peak detecting of the data channel signal generates a plurality of spreading codes, each of which corresponds to the data channel signal of each of a plurality of symbol period, based on the peak receiving time of the random access channel signal;

wherein peak detecting of the data channel signal despreads the data channel signal of the plurality of symbol periods using the plurality of spreading codes;

stores despread data channel signal of the plurality of symbol periods;

sums stored data channel signals to produce a summed data channel signal; and detects the peak of the data channel signal from the summed data channel signal.

15. A method as claimed in claim 12, wherein spreading code generating starts generating the spreading code when receiving the peak of the random access channel signal.

16. A method as claimed in claim 14, wherein the data channel signal storing starts storing the despread data channel signal of the plurality of symbol periods based on the first peak time.

17. A method as claimed in claim 14, wherein:

the random access channel signal receiving receives a plurality of random access channel signals;

peak detecting of the random access channel signal detects at least one peak for each of the plurality of random access channel signals;

peak receiving time detecting of the random access channel signal detects a peak receiving time for each of the plurality of the random access channel signals; and peak detecting of the data channel signal generates the plurality of spreading codes based on each of the plurality of peak receiving times of the random access channel signals.

18. A method of claimed in claim 17, wherein:

data channel signal receiving includes receiving a plurality of data channel signals;

data channel signals despreading includes despreading each of the plurality of symbol periods using one of the spreading codes;

channel signal storing stores the plurality of despread data channel signals of plurality of symbol periods;

data channel signal averaging sums each of the plurality of stored data channel signals of the plurality of symbol periods at a same time in each the plurality of symbol periods;

peak detecting of the data channel signal includes detecting at least one peak for each of the plurality of data channel signals from the summed data channel signal; and peak receiving time detecting of the data channel signal detects a peak receiving time for each of plurality of data channel signals from each of the plurality of peak detected data channel signals.

* * * * *